(12) United States Patent
Kidd et al.

(10) Patent No.: US 7,502,772 B2
(45) Date of Patent: Mar. 10, 2009

(54) METHOD AND APPARATUS FOR OBTAINING AND USING IMPACT SEVERITY TRIAGE DATA

(75) Inventors: Scott D. Kidd, San Antonio, TX (US); Darrin A. Smith, San Antonio, TX (US)

(73) Assignee: Injury Sciences LLC, San Antonio, TX (US)

( * ) Notice: Subject to any disclaimer, the term of this patent is extended or adjusted under 35 U.S.C. 154(b) by 39 days.

(21) Appl. No.: 11/363,421

(22) Filed: Feb. 27, 2006

(65) Prior Publication Data

US 2007/0203866 A1    Aug. 30, 2007

(51) Int. Cl.
G06F 17/00   (2006.01)
G06N 5/02    (2006.01)

(52) U.S. Cl. .............................. 706/48; 704/1; 715/234

(58) Field of Classification Search .................. 706/48, 706/45; 703/7; 705/4
See application file for complete search history.

(56) References Cited

U.S. PATENT DOCUMENTS

| | | | | |
|---|---|---|---|---|
| 4,435,769 A | | 3/1984 | Nagano et al. ............... 364/464 |
| 4,839,823 A | * | 6/1989 | Matsumoto .................. 706/52 |
| 5,128,859 A | | 7/1992 | Carbone et al. ............... 705/4 |
| 5,317,503 A | | 5/1994 | Inoue .......................... 700/90 |
| 5,377,098 A | | 12/1994 | Sakai .......................... 364/406 |
| 5,432,904 A | | 7/1995 | Wong .......................... 395/161 |
| 5,469,628 A | | 11/1995 | Chartrand ..................... 33/608 |
| 5,504,674 A | | 4/1996 | Chen et al. ................... 364/401 |
| 5,657,233 A | | 8/1997 | Cherrington et al. ..... 364/464.3 |
| 5,657,460 A | | 8/1997 | Egan et al. ................... 395/326 |
| 5,839,112 A | | 11/1998 | Schreitmueller et al. ....... 705/4 |
| 5,950,169 A | | 9/1999 | Borghesi et al. ............... 705/4 |
| 6,052,631 A | | 4/2000 | Busch et al. .................. 701/29 |
| 6,246,933 B1 | | 6/2001 | Bague .......................... 701/35 |
| 6,381,561 B1 | | 4/2002 | Bomar, Jr. et al. ............. 703/8 |
| 6,470,303 B2 | | 10/2002 | Kidd et al. ..................... 703/8 |
| 6,711,495 B1 | | 3/2004 | Ukai et al. ................... 701/207 |
| 6,718,239 B2 | | 4/2004 | Rayner ........................ 701/35 |
| 6,735,506 B2 | | 5/2004 | Breed et al. ................... 701/36 |
| 6,885,981 B2 | | 4/2005 | Bomar, Jr. et al. ............. 703/8 |
| 6,950,013 B2 | | 9/2005 | Scaman et al. ............. 340/436 |
| 6,975,919 B2 | | 12/2005 | Kluft .......................... 700/177 |
| 7,197,444 B2 | | 3/2007 | Bomar, Jr. et al. ............. 703/8 |
| 7,239,945 B2 | | 7/2007 | Hiemer et al. ................ 701/29 |

(Continued)

OTHER PUBLICATIONS

U.S. Appl. No. 11/511,823, filed Aug. 29, 2006, entitled "Method And Apparatus For Obtaining And Using Event Data Recorder Triage Data," by Scott D. Kidd and Darrin A. Smith.

(Continued)

*Primary Examiner*—David R Vincent
*Assistant Examiner*—Kalpana Bharadwaj
(74) *Attorney, Agent, or Firm*—Trop, Pruner & Hu, P.C.

(57) ABSTRACT

In one embodiment, a method includes receiving data for a vehicle involved in an accident, analyzing the data for classification of damaged components and operations to be performed on the vehicle, and generating a triage decision for the vehicle based on a rules-based analysis of the classification and the operations. The triage decision may be used to route a claim corresponding to the accident to an appropriate resource for analysis and handling.

23 Claims, 4 Drawing Sheets

U.S. PATENT DOCUMENTS

2004/0148188 A1* 7/2004 Uegaki .......................... 705/1
2004/0243368 A1* 12/2004 Hiemer et al. ................. 703/8
2007/0288135 A1 12/2007 Kidd et al. .................... 701/29

OTHER PUBLICATIONS

U.S. Appl. No. 10/166,866, filed Jun. 11, 2002, entitled "Methods And Apparatus For Using Black Box Data To Analyze Vehicular Accidents," by Darrin A. Smith and Scott Palmer.

European Patent Office, International Search Report And Written Opinion For International Application. No. PCT/US07/13215, 8 pages, Jan. 31, 2008.

U.S. Patent and Trademark Office, International Search Report and Written Opinion for International Application. No. PCT/US07/04410, 7 pages, Feb. 26, 2008.

PCT/US2007/13214 International Search Report with Written Opinion of the International Searching Authority Mailed Sep. 19, 2008.

* cited by examiner

METHOD AND APPARATUS FOR OBTAINING AND USING IMPACT SEVERITY TRIAGE DATA

BACKGROUND

The present invention relates to vehicular accident analysis and more particularly to analysis of information regarding an accident for triage and related purposes.

Organizations such as insurance companies and others have the task of investigating auto accidents to resolve property and injury claims. Frequently, these organizations will analyze incoming claims to apply the proper expertise to the type of claim. As an example, an accident involving the death of a vehicle occupant may require different expertise and handling than a minor accident in a fast-food drive-through line. One of the first tasks in a claim analysis is to review vehicle damage and write a repair estimate. This can be the earliest indication of the severity of the impact.

While this information is not sufficient to determine a reasonable estimate of impact severity using more detailed information, it can give an indication of what resources should be assigned to evaluate the claim. However, typically this indication is subject to significant subjective analysis and can be extremely unreliable. An insurance company employee, often in a position having high turnover, will analyze a damage report and possibly photographs of the damaged vehicle. This employee's analysis is subjective and the data relied upon can provide inconsistent determinations depending on a given analyst. Nor is there any in-house learning that occurs over time such that improved initial analysis is achieved.

Accordingly, industry analysis confirms that as many as 40% of accidents of a low severity nature are at least initially subjectively analyzed as a high severity impact. As a result, claims are forwarded to a potentially incorrect resource for handling. Low severity resources typically involve property claim handling and auditing of claims. When a later injury claim associated with such an accident is received, evidence and information to dispute such a claim may be unavailable. Such initial poor diagnoses lead to losses for the insurance industry in the billions of dollars annually.

Other resources such as trained engineers and accident reconstructionists can be employed later in a claims process to derive an estimate of impact severity using repair estimates and other information. However, this information does not provide timely or cost effective information to allow the appropriate allocation of resources early in a claim life cycle.

SUMMARY OF THE INVENTION

In one aspect, the present invention includes a computer-implemented method to categorize impacts as low impact severity or non-low impact severity. A computer system is utilized to receive limited input data such as repair estimate information, e.g., from another computer and to assess components and operations listed on the repair estimate. Based on components and operations to the components, a preliminary determination of the impact severity may be made. This preliminary determination may be in the form of a triage decision, which may be an indication of whether the accident was a low severity impact or non-low severity impact, rather than more detailed estimations, e.g., of change of velocity or other impact severity measures.

Another aspect of the invention resides in a computer-implemented method to evaluate a second vehicle and combine results with the first vehicle evaluation to further refine impact categorization.

Further still, another aspect of the invention is a computer-implemented method for an evaluation routine to learn new rules from estimates using calculated impact severity or measurements of actual impact severity such as from an event data recorder and the components and operations from the repair estimate of the subject vehicle. Yet another aspect of the invention is a computer-implemented method for an evaluation routine to learn new rules from qualitative estimates of impact severity and the components and operations from the repair estimate of the subject vehicle.

In one implementation, a method may include receiving data for a vehicle involved in an accident, analyzing the data for classification of damaged components and operations to be performed on the vehicle, and generating a triage decision for the vehicle based on a rules-based analysis of the classification and the operations. The data may correspond to a repair estimate obtained from a third party, e.g., via a computer network.

In another implementation, the present invention may triage multiple estimate data for vehicles involved in an accident to obtain multiple severity estimates, determine a probability of impact severity for the accident based at least in part on the severity estimates, and report the probability. Then, an entry including the probability and related information may be stored in a database corresponding to the accident. In turn, the entry may be used to update a rules-based triage analysis program based on a comparison of the triage decision with a qualitative analysis of the accident. The updated program may then be used to triage an unrelated accident.

DETAILED DESCRIPTION

Figure 1:
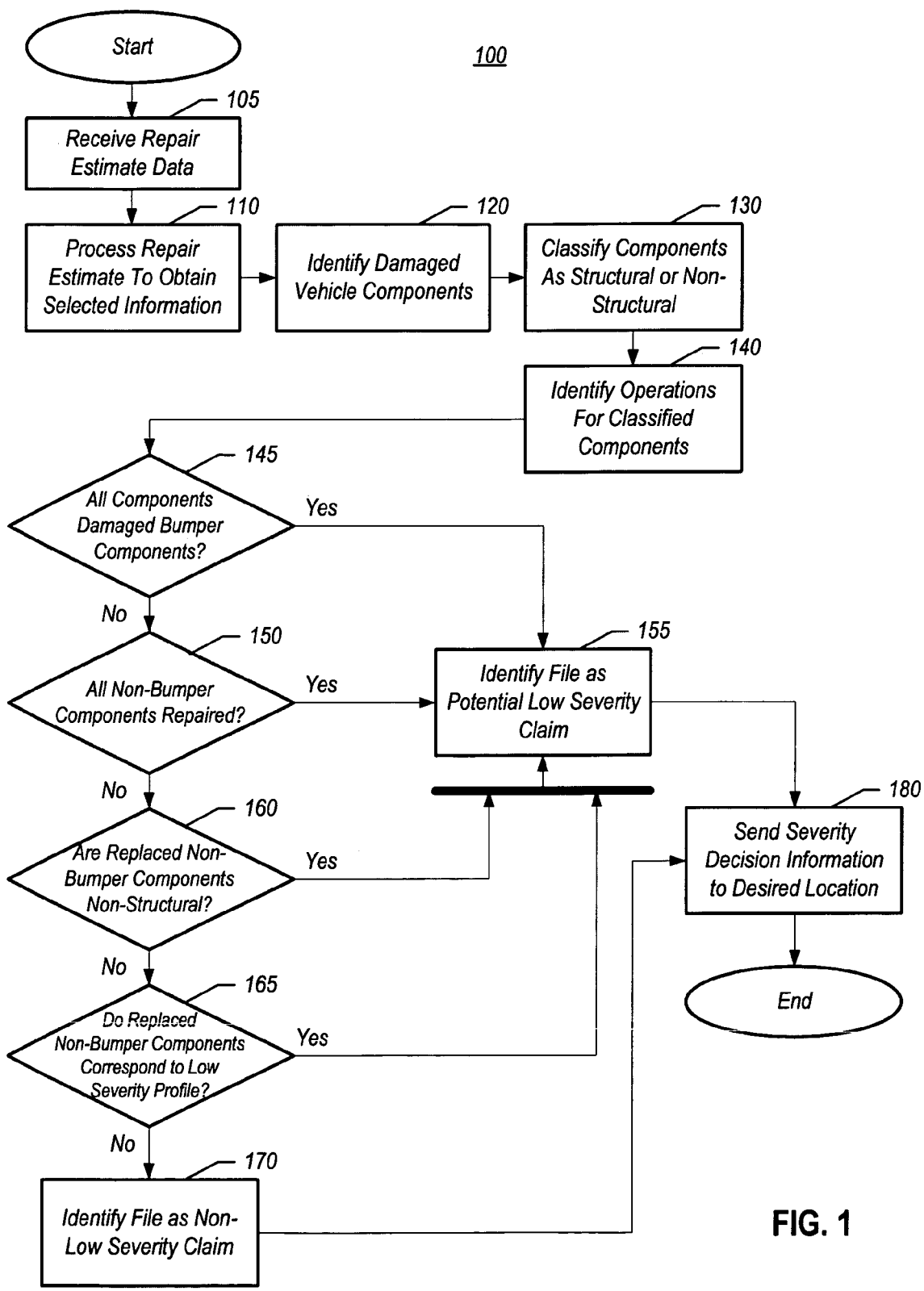
FIG. 1 is flow diagram of a method of evaluating repair estimate information in accordance with one embodiment of the present invention.

Repair estimates are typically created for a vehicle involved in a collision to list vehicle components and operations to be performed to repair the damaged vehicle. The estimate information may be available through computer-to-computer communication via transfer of the estimate data, in some embodiments. As an example, repair estimate data may be transmitted from a claims adjuster or repair shop to an insurance company, and the data may be further transmitted to an accident analysis firm or other third party. The repair estimate information is often used to evaluate impact severity. Impact severity can be used to determine possible injury potential of the accident. In one embodiment, techniques disclosed in U.S. Pat. No. 6,470,303, commonly owned with the present application and the disclosure of which is hereby incorporated, may be used to estimate impact severity. In this manner, repair estimate damage is used to estimate impact severity in terms of a vehicle's change in velocity.

In accordance with various embodiments, a separate and distinct use of repair estimate data is in connection with a determination of accident classification. This accident classification may thus be a triage decision that aids an entity such as an insurance company in routing a claim corresponding to an accident to an appropriate handling mechanism. The triage decision may be a low cost, rapid decision based on limited data, namely information regarding damage to a vehicle involved in a collision. The triage decision does not determine or document vehicle damage. Instead, in various embodiments, the triage decision may be a qualitative decision used to determine where to route the claim. Such a qualitative decision is in contrast to a quantitative decision that may require greater amounts of data, time and resources to perform a quantitative analysis of an accident.

Using embodiments of the present invention for a triage decision, it may be determined that an accident should be classified as a low severity impact and accordingly, a file related to the accident (e.g., a claim file) is routed for a low severity impact review process. Alternately, it may be determined that the accident was not a low severity impact and the corresponding file may be routed for a non-low severity impact review process. The definition of a low severity impact may vary in different embodiments, but in general may correspond to an impact in which personal injury is unlikely to occur. In some embodiments, a low severity impact may be an impact where the change of the vehicle's velocity is less than approximately 10 mph. Similarly, a non-low severity impact may be an impact in which injury potential is more likely (or even presumed), and in some embodiments may be where the change of the vehicle's velocity is greater than approximately 10 mph.

Using embodiments of the present invention, information within the repair estimate allows triage of claims early in a claim life cycle. Based on this analysis, the claim may be forwarded to the appropriate evaluation resources based on a categorization of impact severity. As one example, repair estimates having bumper damage only may, for most vehicles, be an indication of a low severity impact since the bumper is designed to protect the vehicle at relatively low velocities. Repair estimates can be examined for bumper components, and if only bumper components are listed (the operation for these components may be irrelevant), the impact for the subject vehicle would be deemed low severity.

Vehicles with damage beyond the bumper (e.g., grille or radiator is damaged) but no damaged structural components (e.g., fender or hood) may also be candidates for low severity review. Structural components may correspond to vehicle parts that create the structural strength of the vehicle such as quarter panel, rear floor pan, and the like. Non-structural components may add some structural strength to the vehicle but are more easily damaged such as the grille, lighting assemblies, radiator, and so forth. Repair estimates can be reviewed for the lack of structural components (in some embodiments, the repair operation(s) for non-structural components may be irrelevant) and these estimates may be categorized as low severity impacts to the subject vehicle.

Vehicles with damage beyond the bumper and only repair operations for damaged structural components (e.g., fender or hood) may also be candidates for low severity review. Repair estimates can be reviewed for the operations associated with structural components and those where only repair was indicated may be categorized as low severity impacts to the subject vehicle.

Other patterns within the damaged components may be indicative of a potential low severity accident. For example, vehicles with replaced structural components beyond the bumper may consistently indicate low severity impacts when matched with estimates of change in velocity from engineering analysis, event data recorder measurement of change in velocity, or other similar quantitative or qualitative measures of impact severity. When these patterns of vehicle damage are found by examining the repair estimates, a collision for a subject vehicle can be classified as low severity. This technique can employ self-learning as measures of impact severity are matched with repair estimates to reveal new damage patterns which meet the low severity classification.

In addition to triage of one or more vehicles involved in an accident, information about impact severity classification can be developed for multiple individual vehicles and then combined to determine a probability of impact severity based on the multiple vehicles. For example, if both vehicles in a two-vehicle accident are categorized as "low severity" then the accident itself, and not just the individual vehicles, has a very high probability of being low severity. If one vehicle is indicated as low severity and the other is not indicated as low severity, then the relative masses of the vehicle can be examined to determine the probability of a low severity impact. If a low mass vehicle sustains damage such that it is not categorized as low severity but has struck a vehicle with higher mass that is categorized as low severity, then the overall accident still has a high probability of having been a low severity impact. If the vehicles are equal mass then the probability might be lower for low severity categorization. If a higher mass vehicle sustains damage outside of the low severity categorization and is struck by a lower mass vehicle that is categorized as low severity, then the claim can be selected for further review as the damage patterns are outside of the expected results. For example, the claim may be flagged for fraud analysis, as the damage pattern indicated is potentially fraudulent in nature. If both vehicles are categorized as not low severity, then the accident has a low probability for categorization as a low severity impact. Note that the probabilities may be reported as a percentage or other indicator of likelihood of the collision as being a low severity or non-low severity impact.

Once an accident or vehicle has been identified as a low severity impact, the categorization can be communicated via computer to a claim file associated with the accident or vehicle or other storage area in another computer system. In various embodiments, a rapid triage of an accident may be performed based on initial damage estimate information. The triage results may then be forwarded to an insurance company or other third party for use in selecting the appropriate resources for claim handling. The triage results may further provide an early indication of likely injury, allowing an insurance company or other entity to take appropriate measures to maintain or preserve evidence, initiate further analysis or the like.

Different techniques for obtaining data and analyzing the data to classify an accident into a category can be implemented in different embodiments. Referring now to FIG. 1, shown is flow diagram of a triage method in accordance with one embodiment of the present invention. As shown in FIG. 1, method 100 may be used to triage incoming data, which may correspond to a claim file for a vehicle accident. This triage process may be performed according to a rules-based software package in some embodiments. As shown in FIG. 1, method 100 may begin by receiving repair estimate data (block 105). Such repair estimate data may be received from various sources, including for example, an insurance company, a claims adjuster, a mechanic writing a damage estimate, a software program designed to document and value vehicle component damage or other such sources. This information may be received at various locations. However, in many implementations, method 100 may be implemented at a central location, e.g., at an insurance company site, an accident analysis firm or other such entity, and more particularly via a computer system at this central location. Accordingly, method 100 may be implemented in a client/server model in which repair estimate data is transmitted by a client system to a server system for analysis. In various embodiments, the transmitted data may be sent in an encrypted form, although the scope of the present invention is not limited in this regard.

Still referring to FIG. 1, the repair estimate may be processed to obtain selected information (block 110). For example, data from the repair estimate may be analyzed to determine identified components (e.g., corresponding to damaged vehicle components) and the operations to be performed on such components (e.g., repair or replace operations). Next damaged vehicle components may be identified (block 120). Specifically, the processed repair estimate information may be analyzed to identify damaged vehicle components. Next, the identified components may be classified as structural or non-structural components (block 130). While such analysis may be made with respect to all components, in some embodiments this classification may be limited to non-bumper components. That is, in some embodiments bumper components may be ignored in triage of the data. After classifying components as structural or non-structural, next the classified components may be analyzed to identify operations therefor (block 140). Specifically, the operation to be performed on the damaged component, according to the data, may be identified. As an example, these operations may correspond to repair or replace operations, however other indications or granularities of operations to be performed may be present in some embodiments.

Still referring to FIG. 1, next it may be determined whether all damaged components are bumper components (diamond 145). If so, control passes to block 155. There the file associated with the analyzed repair estimate data may be identified as a potential low severity claim (block 155).

If instead at diamond 145, it is determined that damaged components extend beyond the bumpers, control passes to diamond 150. There it may be determined whether all damaged non-bumper components are to be repaired (as opposed to requiring replacement) (diamond 150). If so, control passes to block 155 for identification of the file as a potential low severity claim. If instead at diamond 150 at least one non-bumper component is indicated to be replaced, control passes to diamond 160. There it may be determined whether all non-bumper components to be replaced are non-structural components (diamond 160). While what is considered to be a non-structural component may vary in different embodiments, in some implementations non-structural components may include vehicle components such as grille, radiator, tail lights, or so forth, however the scope of the present invention is not so limited. If all non-bumper components to be replaced are non-structural, control may pass to block 155 for identification of the file as a potential low severity claim.

If instead at diamond 160 it is determined that at least one non-bumper component to be replaced is structural, control passes to diamond 165. There, it may be determined whether the non-bumper component or components to be replaced correspond to a low severity profile (diamond 165). That is, the non-bumper component(s) to be replaced may be compared with a pattern of replaced non-bumper components in a database of prior analyzed vehicle accidents to determine whether such damage pattern typically falls within a low severity group. In some implementations, instead of comparing a damage pattern to an entire database of prior analyzed accidents, the damage pattern for a vehicle under analysis may be compared to a statistically significant subsegment of the database. As one example, a subsegment may correspond to entries in the database for the same or related make or model or type of vehicle. For example, if an analyzed vehicle is a pickup truck, the damage pattern may be compared to a subsection of the database for pickup trucks. As another example, light body domestic cars may be a subsegment of a database that may be used for comparison with a damage estimate data corresponding to a given light body domestic vehicle model, for example. Of course other segmentations of a database can be realized in other embodiments.

More so, it is to be noted that the database and entries in the database identified as potential low severity claims (or potential non-low severity claims) may change over time as new rules (e.g., based on varying damage patterns) are updated in a rules-based analysis of damage estimate data from multiple accidents. For example, an accident analysis firm may receive incoming damage estimate data from many vehicle accidents, such as received from various insurance carriers over a long period of time. Over this period of time, rules-based accident analysis software may detect damage patterns that it classifies as low severity (or non-low severity) impacts. Given additional data inputs, such patterns may lead to different determinations of low or non-low severity impacts, over time. By using a self-learning software analysis in accordance with an embodiment of the present invention, improved triage of incoming data as corresponding to a low severity or non-low severity crash can be obtained. Such improved triage can allow an insurance company or other entity to more effectively allocate resources and identify potential abusive claims early in a claims process.

Still referring to FIG. 1, if at diamond 165 replaced non-bumper component(s) correspond to a low severity profile, the file may be identified as a low severity claim at block 155, discussed above. Otherwise, the file may be identified as a non-low severity claim (block 170). In either event, from blocks 155 and 170, control passes to block 180, where the severity decision information may be sent to a desired location (block 180). For example, the accident analysis firm that hosts method 100 may transmit, e.g., via a secured link or in an encrypted format, a triage result to an insurance company that indicates the file for the associated damage estimate data as either a low severity or non-low severity crash. In some embodiments, such severity decision information may also include a probability factor, e.g., a percentage or other likelihood indicator to identify the confidence level of the severity decision. Although not shown in FIG. 1, it is to be understood that an entry in a database may be made for the vehicle, including the information received (e.g., repair estimate information), data determined (e.g., vehicle damage pattern and the like) and the triage decision. Such entry may be used in a self-learning process to improve triage decisions, and may further be used for comparison with unrelated accidents as described further below. While described with this particular implementation in the embodiment of FIG. 1, it is to be understood that the scope of the present invention is not so limited and other manners of triaging incoming repair estimate data may be realized.

Figure 2:
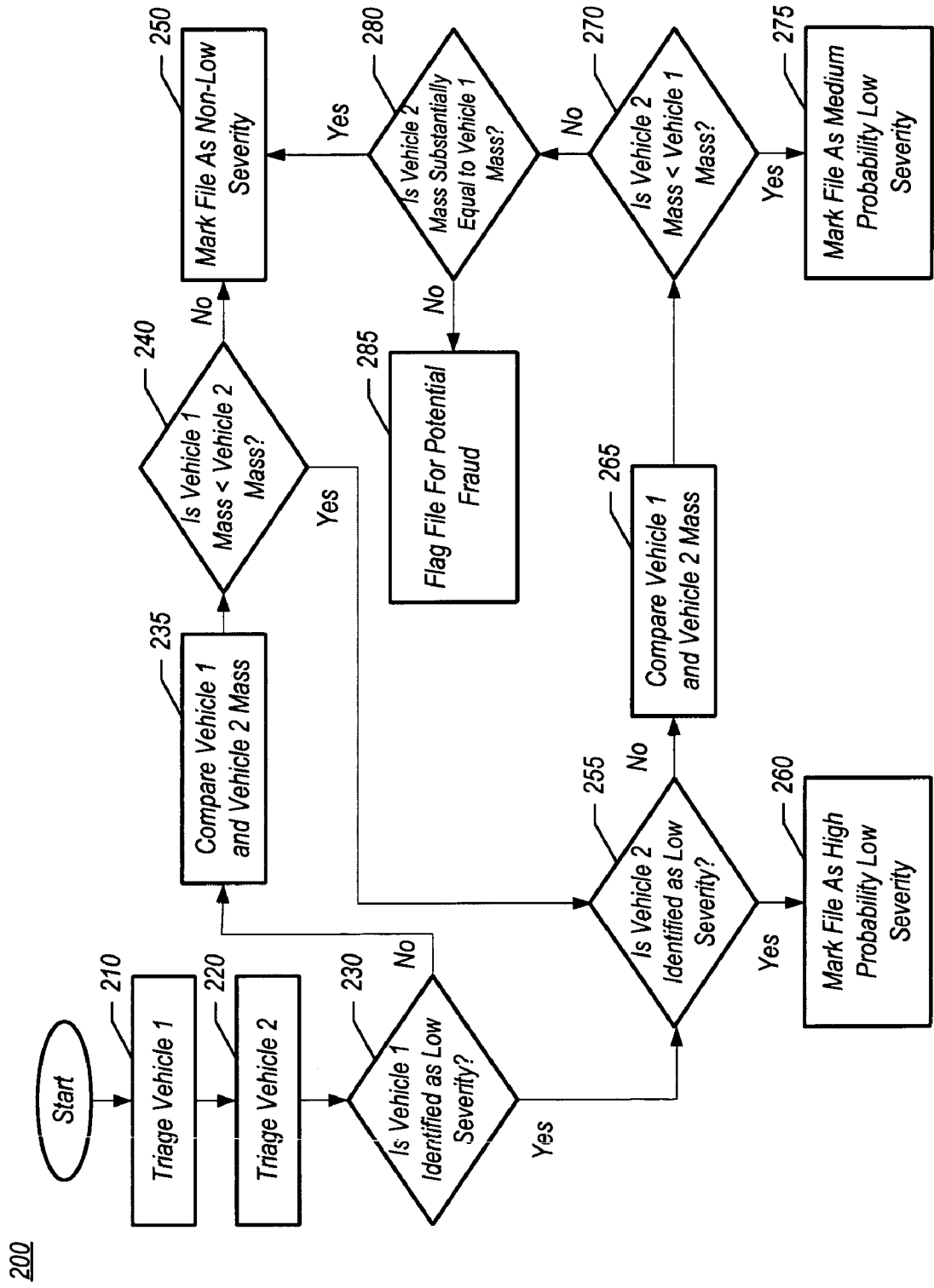
FIG. 2 is a flow diagram of a method of analyzing a vehicle accident in accordance with one embodiment of the present invention.

Referring now to FIG. 2, shown is a flow diagram of a method of analyzing a vehicle accident in accordance with one embodiment of the present invention. As shown in FIG. 2, method 200 may be implemented by a computer, such as a server at a central location, e.g., of an accident analysis firm or other such entity. As shown in FIG. 2, method 200 may begin by triaging a first vehicle (block 210). More specifically, vehicle damage estimate data may be analyzed for a first vehicle involved in an accident to develop a triage analysis for the vehicle. Such triage analysis may be implemented in accordance with method 100 shown in FIG. 1, as one example. Such a triage decision may identify the vehicle as being involved in a low severity crash or a non-low severity crash. A similar analysis may be performed with respect to a second or multiple vehicles involved in the accident (block 220).

Still referring to FIG. 2, next it may be determined if the first vehicle is identified as a low severity impact (diamond 230). That is, it may be determined whether the triage analysis identifies vehicle 1 as being the subject of a low severity impact. If not, control may pass to block 235. There, the masses of the first and second vehicles may be compared. Note that instead of masses, one or more other physical parameters of the vehicles may be compared to determine relative size. Based on this analysis it may next be determined whether the vehicle mass of the first vehicle is less than the mass of the second vehicle (diamond 240). If the first vehicle has a greater mass (e.g., the first vehicle is larger than the second vehicle), control may pass to block 250. There the file (e.g., a file corresponding to the accident under analysis) may be identified as a non-low severity impact accident (block 250). This indication of the accident as being a non-low severity impact may be provided to an interested entity such as an insurance company in embodiments in which method 200 is implemented in a central location (e.g., of an accident analysis firm). Note that at diamond 240, if the first vehicle mass is greater than the second vehicle mass, control may pass to diamond 255, discussed below.

Still referring to FIG. 2, if instead at diamond 230 it is determined that the first vehicle is identified as being subjected to a low severity impact, control passes to diamond 255. There it may be determined whether the second vehicle is similarly identified as being subjected to a low severity impact. If so, control passes to block 260, where the file may be marked with a high probability of a low severity impact (block 260). The high probability may correspond to a confidence level of the decision and in some embodiments may indicate a greater than approximately 75% likelihood of the decision. Accordingly, this high probability decision may be transmitted to an insurance company requesting the analysis, for example.

Still referring to FIG. 2, if instead at diamond 255 it is determined that the second vehicle is not indicated as being subjected to a low severity impact, control passes to block 265. There the masses of the two vehicles may be determined (block 265). Based on that analysis, diamond 270 may determine whether the second vehicle's mass is less than the first vehicle's mass. If so, the file associated with the accident may be identified as a medium probability of a low severity impact (block 275). The medium probability may correspond to a confidence level of the decision and in some embodiments may indicate between approximately 50% and 75% likelihood of the decision . . . If instead at diamond 270 it is determined that the second vehicle's mass is not less than the first vehicle's mass, control passes to diamond 280. There it may be determined whether the mass of the second vehicle is substantially equal to the mass of the first vehicle. If so, the file may be marked as a non-low severity impact (block 250), discussed above.

If instead at diamond 280 it is determined that the second vehicle's mass is not substantially equal to the first vehicle's mass (i.e., the second vehicle is a greater mass than the first vehicle), control passes to block 285. There, the file may be flagged for potential fraud (block 285). That is, when a second vehicle is greater in mass than a first vehicle and yet is indicated to have a non-low severity impact, this may be an indication of a claim being made fraudulently e.g., for greater damage than was actually incurred or the like.

Figure 3:
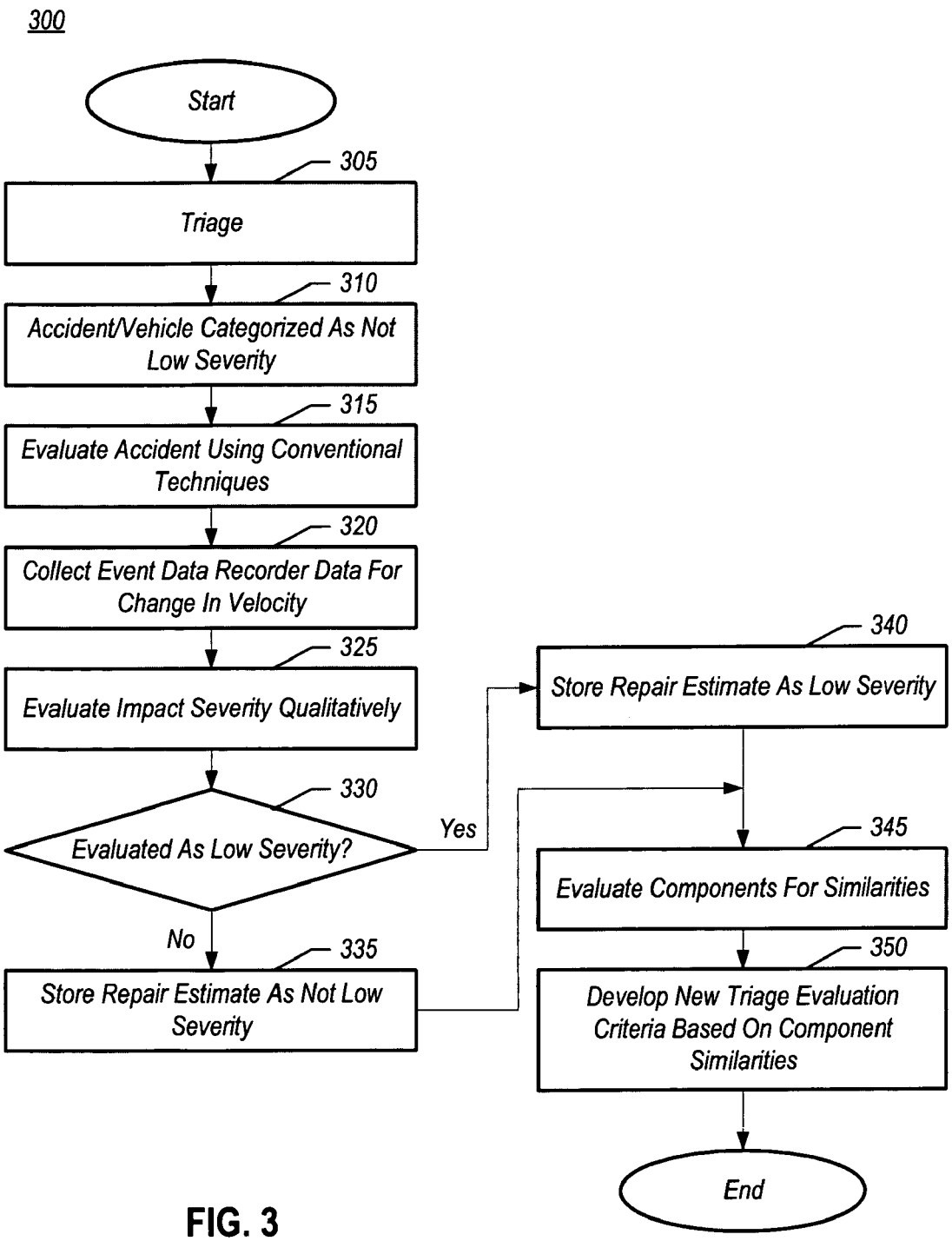
FIG. 3 is a flow diagram of a method of developing updated evaluation rules for accident triage in accordance with one embodiment of the present invention.

Referring now to FIG. 3, shown is a flow diagram of a self-learning method in accordance with one embodiment of the present invention. Method 300 may be implemented by the same central system that performs the methods described in FIGS. 1 and 2, in some embodiments. As shown in FIG. 3, method 300 may begin by first performing a triage method (block 305), such as that described above with respect to FIG. 1. Of course, triage data may be obtained (and a triage method performed) in other manners, and method 300 may be performed at various times, even in the absence of a new triage analysis.

The accident and/or vehicle may be categorized as a non-low severity incident (block 310). Accordingly, such a non-low severity impact may be evaluated using traditional or conventional techniques (block 315). While such conventional techniques may vary in different embodiments, in some implementations the conventional techniques may include traditional engineering/accident reconstruction techniques and/or computer-implemented estimates of impact severity (e.g., change in velocity).

Still referring to FIG. 3, next control passes to block 320. There, event data may be collected for a determination of change in velocity from the information (block 320). Accordingly, in accidents involving one or more vehicles that includes an event data recorder (EDR), information from the EDR may be obtained and used and to self-learn improved manners of triaging in accordance with an embodiment of the present invention.

Still referring to FIG. 3, next the impact severity for the vehicle and/or accident may be evaluated qualitatively (block 325). Such qualitative impact severity may be based on the various data including, for example, EDR data, or other data obtained using conventional techniques or in other such manners.

It may then be determined whether the vehicle/accident has been evaluated as a low severity situation (diamond 330). That is, using conventional techniques and available information, it may be determined whether the accident is evaluated as a low severity situation. If so, control may pass to block 340. There, the repair estimate associated with the vehicle may be stored as a low severity impact (block 340). As an example, a database that includes repair estimates for a number of accidents may be updated with the current repair estimate. Furthermore, the entry for the current repair estimate may indicate the associated accident as a low severity situation, as determined by a conventional technique, along with other information such as damage pattern, change in velocity information and the like.

This claim information, which was triaged as a non-low severity impact and then analyzed further to obtain a different result, may be used to improve a rules-based triage program. Thus, still referring to FIG. 3, next the damaged components of the repair estimate may be evaluated for similarities (block 345). More specifically, the components subjected to damage may be compared to patterns present in the database. If the damage pattern of the car is substantially similar to (e.g., matches or is close to) a pattern present in other accidents, either for vehicles of the same make and model or similar types of vehicles, new rules may be developed for future triaging operations. Accordingly, control passes to block 350. There, new triage evaluation criteria may be developed based on such component similarities in the damage patterns for a car accident and previous accidents (block 350). These new criteria may thus be applied to future accidents to obtain more accurate triage results.

Still referring to FIG. 3, if at diamond 330 it is determined that the impact was not a low severity impact, control passes to block 335. There, the repair estimate may be stored as a non-low severity impact (block 335). Further, control may pass to block 345, as the patterns for non-low impact also may be used to modify the rules of evaluation. While described with this particular implementation in the embodiment of FIG. 3, the scope of the present invention is not so limited.

Figure 4:
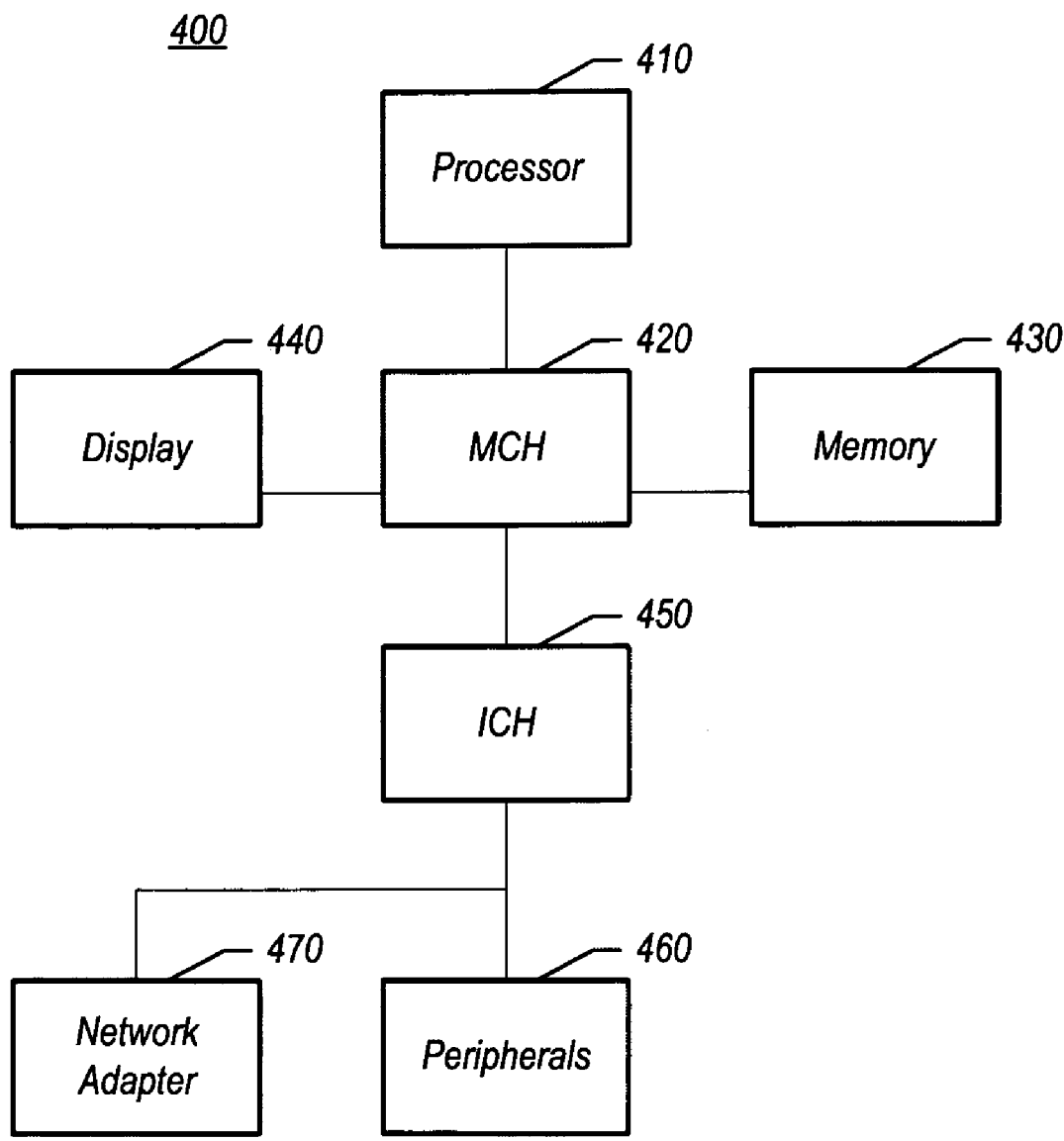
FIG. 4 is a block diagram of a system in accordance with an embodiment of the present invention.

Referring now to FIG. 4, shown is a block diagram of a system in accordance with one embodiment of the present invention. As shown in FIG. 4, system 400 may be a computer system, such as a personal computer, server computer or other such system. System 400 may include a processor 410, which may be a microprocessor such as a central processing unit. Processor 410 is coupled via a memory controller hub (MCH) 420 that in turn is coupled to a memory 430 and a display 440, which may be a flat panel display, for example. During operation, memory 430 may store software in accordance with an embodiment of the present invention that includes instructions to perform the various techniques described herein.

As further shown in FIG. 4, MCH 420 is coupled to an input/output controller hub (ICH) 450. In turn, ICH 450 may be coupled to various peripherals 460 and a network adapter 470. Network adapter 470 may be used to communicate between system 400 and one or more other computers via a computer network, such as a local area network (LAN), a wide area network (WAN), or a wireless network, such as a wireless LAN (WLAN). Furthermore, network adapter 470 may communicate with remote systems, such as computers of an insurance company or other third party that desires to send accident information to system 400 for processing in accordance with an embodiment of the present invention. Such communication may be via the Internet or another such computer network. In some implementations, these communications may be made secure, e.g., via encryption or in another secure format.

Accordingly, system 400 may receive incoming accident data from one or more sources and process the data to obtain a triage report indicative of whether the accident is deemed to be a low severity impact or a non-low severity impact. This triage report may be sent back to the one or more sources for their further use. Furthermore, the triage report and the data from the incoming accident data may be stored in a database, e.g. of system 400 for later analysis and use in modifying a rules-based triage program. While described with this particular implementation in the embodiment of FIG. 4, is to be understood that the scope of the present invention is not so limited and other systems may be used to implement embodiments of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer-implemented method comprising:
    receiving accident data in a computer for a vehicle involved in an accident, the accident data including repair estimate information received from a source external to the computer and having an identification of damaged components and operations to be performed thereon;
    analyzing the accident data to classify the damaged components as being structural or non-structural and the operations to be performed thereon; and
    generating an impact severity triage decision for the vehicle, corresponding to a preliminary determination of whether the accident was a low severity impact or a high severity impact, based on a rules-based analysis of the classification and the operations, the impact severity triage decision to be used to determine where to route a claim associated with the accident.

2. The computer-implemented method of claim 1, wherein receiving the accident data comprises receiving the repair estimate information from a third party via a computer network.

3. The computer-implemented method of claim 2, further comprising transmitting the impact severity triage decision to the third party via the computer network, the impact severity triage decision indicating the accident as either a low severity impact or a non-low severity impact.

4. The computer-implemented method of claim 1, further comprising storing an entry corresponding to the accident in a database, the entry including vehicle component damage information for the accident data and the impact severity triage decision.

5. The computer-implemented method of claim 4, wherein storing the entry further comprises storing a damage pattern of the vehicle in the entry.

6. The computer-implemented method of claim 1, wherein the rules-based analysis comprises:
    determining if any structural components of the vehicle are identified for replacement; and
    generating the impact severity triage decision as a low severity impact if no structural components of the vehicle are identified for replacement.

7. The computer-implemented method of claim 1, wherein the rules-based analysis comprises:
    if any structural components of the vehicle are identified for replacement, determining if a damage pattern of the vehicle corresponds to a low severity profile of an accident database, the accident database including prior analyzed accidents having damage patterns falling in a low severity group; and
    generating the impact severity triage decision as a low severity impact if the damage pattern of the vehicle corresponds to the low severity profile, otherwise generating the triage decision as a non-low severity impact.

8. The computer-implemented method of claim 1, further comprising:
    flagging a claim associated with the impact severity triage decision for fraud analysis based on the rules-based analysis, wherein the rules-based analysis further comprises analysis of a second vehicle involved in the accident and a relative mass of the first and second vehicles.

9. A computer-implemented method comprising:
    triaging first repair estimate data received in a computer for a first vehicle involved in an accident to obtain a first impact severity estimate;
    triaging second repair estimate data received in the computer for a second vehicle involved in the accident to obtain a second impact severity estimate;
    determining a probability of impact severity for the accident based at least in part on the first impact severity estimate and the second impact severity estimate; and
    reporting the probability of impact severity.

10. The computer-implemented method of claim 9, wherein determining the probability of impact severity further comprises comparing a physical parameter of the first vehicle and the second vehicle if the first impact severity estimate and the second impact severity estimate differ.

11. The computer-implemented method of claim 10, further comprising flagging a claim associated with the accident for fraud analysis if one of the first and second impact severity estimates do not meet a predetermined rule, based on the physical parameters of the first and second vehicles.

12. The computer-implemented method of claim 9, wherein triaging the first repair estimate data comprises determining if any structural components of the first vehicle are identified for replacement.

13. The computer-implemented method of claim 9, further comprising obtaining the first repair estimate data and the second repair estimate data from a third party via a computer network.

14. The computer-implemented method of claim 13, further comprising transmitting the probability of impact severity to the third party via the computer network.

15. The computer-implemented method of claim 9, further comprising storing an entry in a database corresponding to the accident, the entry including the first and second repair estimate data, the first and second impact severity estimates, and the probability of impact severity.

16. The computer-implemented method of claim 15, wherein storing the entry further comprises storing a first damage pattern for the first vehicle and a second damage pattern for the second vehicle.

17. The computer-implemented method of claim 16, further comprising:
comparing the first damage pattern to a subset of damage patterns in the database, the subset of damage patterns for at least one vehicle related to the first vehicle; and
updating a rules-based triage analysis program based on the comparison, wherein the rules-based triage analysis program is used to triage the first repair estimate data and the second repair estimate data.

18. The computer-implemented method of claim 17, further comprising applying the updated rules-based triage analysis program to triage an unrelated accident.

19. An article comprising a machine-accessible medium including instructions that when executed cause a system to:
receive an impact severity triage report generated by a triage program indicative of a non-low severity impact for an accident involving a vehicle, the impact severity triage report including a vehicle damage pattern and a repair estimate;
receive an impact analysis report generated independently of the impact severity triage report indicative of a low severity impact for the accident;
analyze the vehicle damage pattern and vehicle damage patterns stored in a database for similarities, each of the vehicle damage patterns stored in the database associated with a vehicle involved in an unrelated prior accident; and
modify triage evaluation criteria of the triage program based on the similarities.

20. The article of claim 19, further comprising instructions that when executed cause the system to store the repair estimate in the database.

21. The article of claim 19, further comprising instructions that when executed cause the system to apply the modified impact severity triage evaluation criteria of the triage program to an unrelated future accident.

22. The article of claim 19, further comprising instructions that when executed cause the system to generate the impact analysis report via a program to determine impact severity based on vehicle component damage.

23. The article of claim 22, further comprising instructions that when executed cause the system to generate the impact analysis report based at least in part on event data recorder (EDR) data obtained from the vehicle.

* * * * *